Sept. 4, 1962 A. EISENSTEIN 3,052,056

TELEPHONE ACCESSORY

Filed July 22, 1960

*INVENTOR.*
Abraham Eisenstein
*BY* Irving Seidman
ATTORNEY

United States Patent Office 3,052,056

Patented Sept. 4, 1962

3,052,056

TELEPHONE ACCESSORY

Abraham Eisenstein, 302 Ave. C, Brooklyn 18, N.Y.

Filed July 22, 1960, Ser. No. 44,741

7 Claims. (Cl. 45—.5)

The present invention relates to a telephone accessory and more particularly to a telephone accessory adapted to be secured beneath the telephone.

A telephone index is commonly used to record, for future reference, the telephone numbers which are frequently called. To be most useful, the index should be located right with the telephone. Since a telephone is not always situated near storage space there may be no convenient place in which to keep the telephone index. If the index is merely kept on the telephone table it takes up valuable room and may be accidentally mislaid. The space under the telephone is ideally suited for the location of the index. The corner feet on which the telephone normally rests raise the telephone to provide sufficient clearance. Instead of an index, it is sometimes desired to have available with the telephone a memorandum pad or both an index and a memorandum pad. In any case, the index or memorandum pad, or both, should be attached to the telephone to prevent its loss.

It is, therefore, an object of the present invention to provide a telephone accessory which will meet the foregoing and other requirements.

It is another object of the present invention to provide a telephone accessory which may be removably secured to any standard table telephone without harming the telephone in any way.

It is a further object of the present invention to provide a telephone accessory adapted to hold a pad which will protect that pad.

It is still another object of the present invention to provide a telephone accessory the size of which may be easily reduced for use with the smaller standard telephone.

Additional features and advantages of the present invention will be apparent from the following description and drawing in which.

Figures 1, 2, 3, 4, 5:
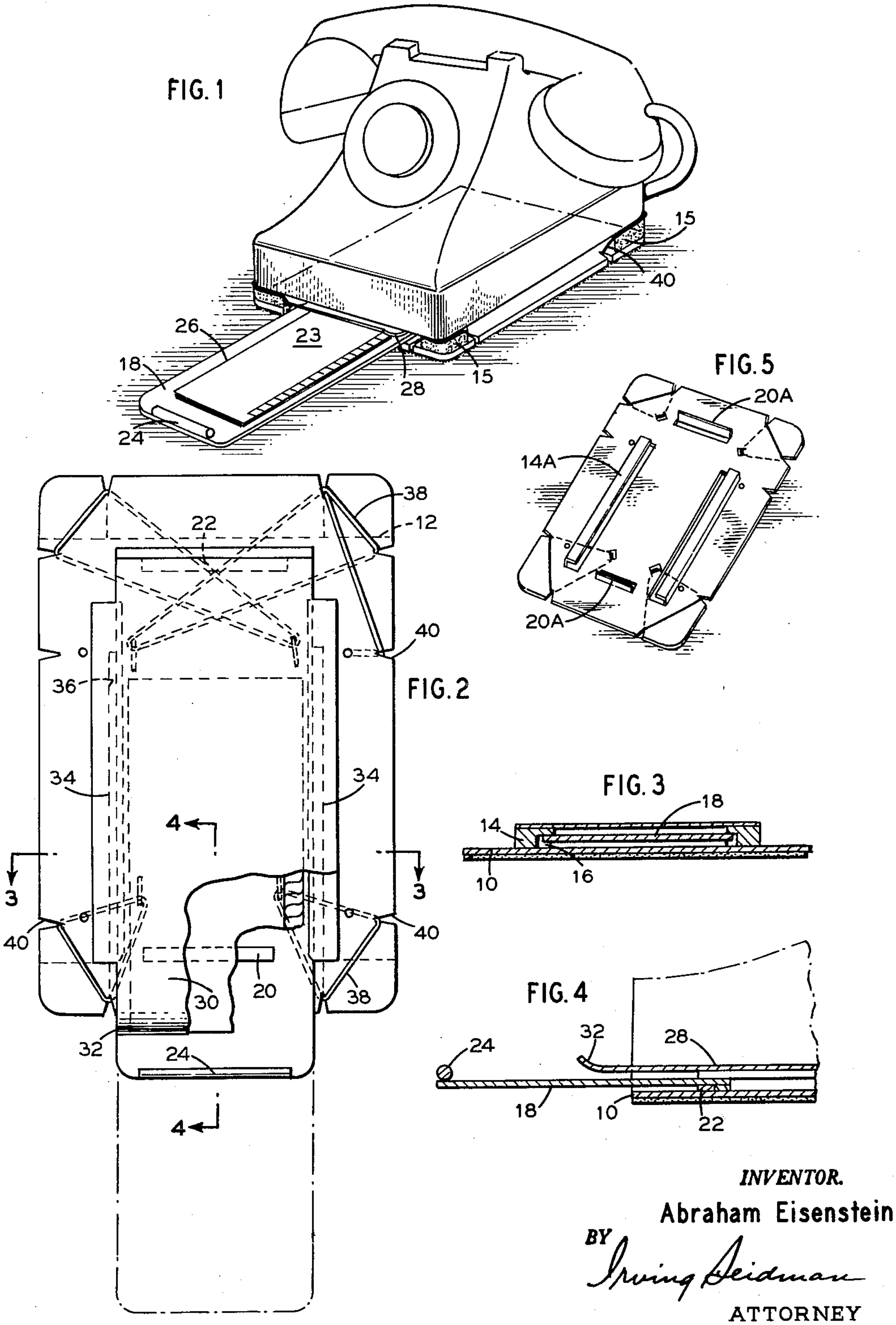
FIG. 1 is a perspective view of the device of the present invention when attached to a telephone.
FIG. 2 is a top plan view of the telephone accessory of the present invention.
FIG. 3 is a cross-sectional view taken along the line 3—3 of FIG. 2.
FIG. 4 is a cross-sectional view taken along the line 4—4 of FIG. 2.
FIG. 5 is a perspective view of another embodiment of the present invention.

Referring now to the drawings, the telephone accessory has a base portion 10 which is of approximate rectangular shape and is dimensioned so that the front edge of the said base portion is in alignment with the front edge of the bottom of the telephone, and may be dimensioned so that all four edges of the base portion 10 are in alignment with the four edges of the bottom of the standard telephone. A notched line 12 is provided at the rear of the base portion 10 so that the user may tear off a predetermined section of said base portion in order to fit the accessory on the smaller standard telephone.

Running parallel to the side edges of the base portion 10 are a pair of elongated guides 14 which are spaced to abut the backs of the front corner feet 15 of the telephone. The space occupied by the corner feet 15 of the telephone is indicated by dotted lines on FIG. 2. The guides 14 each have a channel 16, facing one another, in which a member 18 is slideably mounted for movement longitudinally of the base portion 10. The forward and back motion of the sliding member 18 is limited by front and back stop means, such as a pair of horizontal abutment elements 20 which rise above the plane of the top surface of the base portion 10 and which cooperate with an abutment member 22 that extends from the lower surface of the back edge of the sliding member 18 to limit such motion.

The sliding member 18 is of elongated rectangular shape and is adapted to hold a pad 23 of the index or memorandum types. A gripping member 24 is positioned at the front edge of the sliding member 18 which extends forward of the base of the telephone between its front corner feet 15 to facilitate moving said sliding member. The pad 23 preferably has a top sheet 26 of moderate rigidity to prevent the pages of the said pad from fraying. A stationary cover portion 28 is mounted in any suitable manner along its side edges on the guides 14. The guides 14 must, of course, be high enough to permit clearance for the sliding member 18 to pass beneath the said cover portion 28. The cover portion 28, which has a front extension 30 of narrower width than its main portion lying between the front corner feet 15 of the telephone, is provided further to protect the pad 23. The front edge of the extension 30 may have an upwardly curved lip 32 to ensure free passage of the sliding member 18 even if the sheets of its pad 23 become curled in time.

A pair of circular elastics 34 are each drawn through a pair of apertures 36 in the base portion 10 alongside each end of the guides 14. Each of the elastics thus provides a pair of loops 38 disposed beneath the base portion 10. The elastics 34 are knotted over each aperture 36 to prevent the elastics from being pulled all the way through. A plurality of notches 40 are arranged along the periphery of the base portion 10 and along the notched line 12 in the event the removable section is not needed.

In order to attach the telephone accessory to a telephone, it is merely necessary to place the accessory beneath the telephone with the front edge of the base portion 10 lined up with the front edge of the telephone. The loops 38 are slipped up over each corner foot of the telephone and are secured in this position by also engaging th loops 38 in the adjacent notches 40 as shown in the lower half of FIG. 2. If, after long use, the elastics lose some of their resiliency, the loops 38 may be engaged in opposite notches as shown in the upper half of FIG. 2.

The sliding member 18, with its attached pad 23, is normally kept in a retracted position. When needed, the pad is easily brought into view by drawing the sliding member forward where it will stay until it is returned.

The relatively rigid top sheet 26 is the first thing the user would notice and it would, therefore, be a good place to contain an advertising message. The pages of the pad 23 may be arranged for side to side opening as illustrated in the drawing, or for bottom or top edge opening.

The base 10 and cover portion 28, as well as the sliding member 18, may be made of any suitable sheet material such as plastic or cardboard. The base portion 10 may alternatively be made of a sheet metal as shown in the embodiment of FIG. 5. In the latter case, the metal would be stamped to form integral guides 14a and abutment members 20a. Protective feet, of felt for example, may be secured to the lower surface of the base portion 10 to prevent scratching of the table top.

The present invention thus provides a telephone accessory to hold an index or memorandum pad which utilizes the space beneath the telephone to keep the pad unobtrusively at hand. In addition, the accessory is easily applied to any standard table telephone. It has also been shown that the telephone accessory is extremely easy to operate and economical to manufacture.

While specific embodiments of the invention have been shown and described in detail to illustrate the application of the invention, it will be understood that the invention may be embodied otherwise without departing from such principles.

What is claimed is:

1. A telephone accessory comprising a base portion, a pair of elongated guides secured on said base portion, a sliding member adapted to hold a pad and mounted between said guides for forward and back movement, a stationary cover portion spaced from said base portion and arranged to protect said sliding member, and means for attaching said telephone accessory beneath a telephone so that the sliding member may be brought into view as desired.

2. A telephone accessory comprising a base portion, a pair of elongated guides secured on said base portion, a sliding member adapted to hold a pad and mounted between said guides for forward and back movement, stop means to limit the forward and back movement of the sliding member, said stop means comprising an abutment member extending from the lower surface of the back edge of the sliding member and a pair of abutment members disposed at the front and back of the top surface of the base portion and means for attaching said telephone accessory beneath a telephone so that the sliding member may be brought into view as desired.

3. A telephone accessory as in claim 1 in which said cover portion has a front extension with an upwardly curved lip to clear the pad carried by the sliding member.

4. A telephone accessory comprising a base portion, a pair of elongated guides secured on said base portion, each of said guides having a channel, a member slideably mounted within said channels for movement longitudinally of the base portion, said sliding member being adapted to hold a pad, and means for attaching said telephone accessory beneath a telephone so that the sliding member may be brought into view as desired, said base portion having a notched line at the rear thereof so that a predetermined section may be removed to accommodate a smaller telephone.

5. A telephone accessory comprising a base portion of approximate rectangular shape dimensioned so that the front edge of said base portion lines up with the front edge of a telephone, said base portion having a notched line at the rear thereof so that a predetermined section may be removed to accommodate a smaller telephone, a pair of elongated guides secured on said base portion, each of said guides having a channel, a member adapted to hold a pad and slideably mounted within said channels for movement longitudinally of the base portion spaced from said base portion and a stationary cover portion arranged to protect said sliding member, said cover portion having a front extension with an upwardly curved lip to clear the pad carried by the sliding member, said pad having a moderately rigid top sheet to protect the lower pages of the said pad, stop means to limit the longitudinal movement of the sliding member, said stop means comprising an abutment member extending from the lower surface of the back edge of the sliding member and a pair of abutment members disposed at the front and back of the top surface of the base portion, gripping means at the front edge of the said sliding member to move the same, and means for attaching said telephone accessory beneath a telephone so that the sliding member may be brought into view as desired, said attachment means comprising a pair of circular elastics, each of said elastics passing through a pair of apertures in the base portion alongside each end of one of said guides to provide a pair of loops disposed beneath said base portion and adapted to be brought up over the corners of said base portion to engage the feet of said telephone, said base portion being notched along its periphery to receive the elastic loops to prevent slipping.

6. A telephone accessory comprising a base portion, a pair of elongated guides struck out from and integral with said base portion, said guides being adapted to hold a pad therebetween for sliding forward and back movement, stop means to limit said forward and back movement, said stop means being struck out from and integral with said base portion, and attachment means comprising a plurality of circular elastics passing through apertures in said base portion, each of said elastics providing a loop disposed beneath said base portion and adapted to be brought up over a corner of said base portion to engage a foot of said telephone, said base portion being notched along its periphery to receive the elastic loops to prevent slipping.

7. A telephone accessory comprising a base portion, a pair of elongated guides secured on said base portion, said guides being adapted to hold a pad therebetween for sliding forward and back movement, stop means to limit said forward and back movement, and attachment means comprising a plurality of circular elastics passing through apertures in said base portion, each of said elastics providing a loop disposed beneath said base portion and adapted to be brought up over a corner of said base portion to engage a foot of said telephone, said base portion being notched along its periphery to receive the elastic loops to prevent slipping.

References Cited in the file of this patent

UNITED STATES PATENTS

| | | |
|---|---|---|
| 1,052,582 | Henderson | Feb. 11, 1913 |
| 1,856,799 | Waters | May 3, 1932 |
| 2,582,562 | Rice | Jan. 15, 1952 |
| 2,852,882 | David | Sept. 23, 1958 |
| 2,990,639 | Van Gieson | July 4, 1961 |

FOREIGN PATENTS

| | | |
|---|---|---|
| 116,938 | Sweden | Aug. 6, 1946 |